United States Patent [19]

Sieb, Reinhard

[11] 3,933,099

[45] Jan. 20, 1976

[54] VEHICLE CONTROL APPARATUS FOR A CLOSED TRANSPORTING SYSTEM

[75] Inventor: Sieb, Reinhard, Luneburg, Germany

[73] Assignee: H. Jungheinrich & Co., Germany

[22] Filed: Jan. 3, 1974

[21] Appl. No.: 430,404

Related U.S. Application Data

[63] Continuation of Ser. No. 275,876, July 27, 1972, abandoned.

[30] Foreign Application Priority Data

July 29, 1971  Germany............................ 2137864

[52] U.S. Cl. .......................... 104/88; 246/5; 180/98
[51] Int. Cl.² ............................................. B61J 3/00
[58] Field of Search ............ 104/88; 246/23, 26, 27, 246/187 B, 3, 5; 180/98; 340/152 T

[56] References Cited

UNITED STATES PATENTS

| | | | |
|---|---|---|---|
| 3,147,817 | 9/1964 | DeLiban | 180/98 |
| 3,268,727 | 8/1966 | Shepard | 246/187 B |
| 3,411,603 | 11/1968 | Kohls | 180/98 |
| 3,495,677 | 2/1970 | Wilson | 180/98 |
| 3,512,601 | 5/1970 | Wilson | 180/98 |
| 3,639,755 | 1/1972 | Wrege | 246/187 B |

Primary Examiner—Trygve M. Blix
Assistant Examiner—Reinhard J. Eisenzopf
Attorney, Agent, or Firm—Toren, McGeady and Stanger

[57] ABSTRACT

Control apparatus for guiding one or more vehicles along a closed transport system having a plurality of routes and a plurality of junctions each allowing a choice of two directions. The system is illustrated as comprising a number of interconnected sub-systems or networks. Each junction has associated therewith a transmitter which sends out a coded signal comprising at least two words, one of which indicates the direction to be taken from the junction to reach the different networks and also indicates the networks which the paths from the junction lead to. The second word does likewise for the route segments of the network or networks to which the paths from the junction lead. A like destination code is stored in the vehicle, and the vehicle compares the stored code and the successive received codes and obeys the word instructions from each successive junction till it arrives at the destination network. It then obeys the word 2 instructions till it arrives at the destination route segment or zone within that network. It may then count pulses generated by route-associated equipment till it arrives at a desired position on the destination route segment, where it can be halted.

28 Claims, 10 Drawing Figures

VEHICLE CONTROL APPARATUS FOR A CLOSED TRANSPORTING SYSTEM

This is a continuation of application Ser. No. 275,876, filed July 27, 1972, now abandoned.

BACKGROUND OF THE INVENTION

1. Field of the invention

This invention relates to control apparatus for a closed transport system comprising a plurality of control routes, a plurality of route junctions which each allow a choice of two directions and at least one vehicle arranged to travel along the routes. More particularly the invention relates to apparatus for controlling passage of at least one vehicle through the system to a destination route segment.

The invention may be used with transport systems which are sub-divided into a plurality of interconnected networks, or with systems which are not so divided. In the following description the term "division" is used to denote a directional decision junction within a network, and the term "branch" is used to denote a directional decision junction where a network is connected to an adjacent network of the system.

Such a transport system can be equipped with rails and with divisions and/or branches which are set in a predetermined direction and can be changed into another direction, or it can be rail-less, having marked paths to guide the vehicles, which paths are defined either by guide rails, if required inserted in the floor, or by cables laid below the floor and which develop an electromagnetic field which effects control means on the vehicles, which are equipped with suitable receiving equipment. Optical paths can also be used, control being effected by stroboscopic rays which are reflected by mirrors on the vehicles. In a rail-less embodiment, the vehicle may have a steering device which is set up in a certain way in the branches and leads the vehicle to the chosen course by known control means.

2. Description of the prior art

In the last method an arrangement of markings on the path of movement is known, for example in the form of magnetic or electromagnetic fields or in the form of mechanical profiles, which are detected by a probe on the vehicle, whereby on the vehicle a recording apparatus records the number of markings and after a certain number gives a steering signal.

Such apparatus has already been proposed in German Patent Application P 15 30 894.

Furthermore, a vehicle according to German Patent Application P 19 55 758 can be adapted for use in an embodiment of the present invention.

These known methods require an important part of the control apparatus in the vehicle. Moreover, in these methods, the path is marked passively, so that the whole control coding must be recorded in the vehicle, particularly as it alters, according to the point from which a vehicle departs. The range of application of such control apparatus is thus limited.

A further disadvantage of such control apparatus is the inflexibility of the system. Alterations in the system or completion of the system require major alteration in the recording devices of the vehicles or cannot be carried out at all without altering the whole system.

Furthermore, in these known apparatuses it is impossible to remove a vehicle from the path of travel and guide it again into the path of travel at another place, since control of its path is obtained by recording elements in the path of movement in order to reach the predetermined destination or goal.

SUMMARY OF THE INVENTION

Various preferred forms of the present invention described in detail hereinafter have been designed with the objects of:

1. overcoming the inflexibility of the above-mentioned known systems and obtaining greater flexibility;

2. simplifying considerably the parts of the control apparatus both included in the vehicle and installed along the routes in the path of travel, thereby raising the level of safety of operation;

3. providing control apparatus which allows the vehicles to be taken from any desired point on the path of travel, for example by leading them away with the aid of a manual control device, and to guide the vehicles again into the path of travel at any other place, without any alteration of the destination coding of the vehicle being necessary;

4. providing a control apparatus whose elements enable operation which is both considerably decentralised and yet may be remote-controlled from a central point; and 5. providing a control apparatus in which a vehicle at any point of the system is provided with a target or destination coding whereby, dependent on this coding, after the start of the vehicle, a directional choice is made for the destination, or an automatically following setting of divisions for the destination is effected. In this is included the facility that several networks can be combined to form the system.

According to the present invention, there is provided control apparatus for a closed transport system comprising a plurality of routes, a plurality of route junctions which each allow a choice of two directions, and at least one vehicle arranged to travel along the routes, the apparatus comprising a transmitter associated with each said junction, each transmitter being arranged to transmit a particular coded signal indicating the direction to be taken at the associated junction to proceed towards various route segments, drive means for moving the or each vehicle, and a respective destination selection device connected to control the drive means of the or each vehicle, said device comprising a store on the or each vehicle in which may be entered a code indicative of a destination route segment for the associated vehicle, a receiver on the or each vehicle for receiving the coded signal transmitted from the transmitter associated with an approaching junction, a respective comparator on the or each vehicle connected to the associated store and receiver for comparing the stored destination signal and the received signal, and respective control means for the or each vehicle responsive to the output of the associated comparator to select the direction to be taken at the junction.

It should be understood that the transmitters are generally located a short distance in advance of the divisions or branches to allow for the time taken to accomplish the change of direction, i.e. so that either the junction can be switched, if necessary, before the arrival of the vehicle, or so that any necessary operation of the steering device on the vehicle takes place in such a way that the selected route from the division can be followed.

The terms "transmitter" and "receiver" may refer to radio, optical or sonic devices, or to devices operating on any other principle suitable for obtaining the desired result. In a preferred embodiment of the invention, a diode matrix is used to effect the desired coding. The matrix permits alteration of the coding of the transmitter by altering its structure, i.e. by merely soldering on or off diodes. Furthermore, in another embodiment it is possible to influence the coding of the transmitter from a distance, preferably from a central point.

According to an embodiment of the invention, the or each vehicle is provided with a steering device and the control means is operative on the steering device to cause the vehicle to take the selected direction. In another embodiment, the or each control means is operative on means associated with the junction such that the junction remains in one position or switches to another position. Preferably, the control means is mounted on the vehicle to choose the direction.

In a further advantageous form of the invention the control means includes a timing circuit which, after switching the junction or after altering the direction of the steering device, frees it and moves it back into the original position. This feature is not indispensable since other types of control means can also be effective for the restoration function, dependent on the type of transport system.

Preferably, the transmitter associated with each junction is arranged to send the coded signal in the form of a fixed series of signal elements each associated with a particular route segment, and on the or each vehicle the receiver and comparator are arranged to function with the same number of signal elements. It can be advantageous for technical reasons to form the transport system from several interconnected networks, whereby regions with various tasks can be connected. Particularly for economic reasons, construction in this way is preferred. In this case, each transmitter is arranged to send also an additional series of signal elements corresponding at least to the number of networks.

Preferably, each transmitter is arranged to send a destination marking together with any signal element associated with a network or route segment, as the case may be, which will be reached on leaving the associated junction.

In a particular embodiment of the invention a counter is arranged on the or each vehicle, which is started when the vehicle enters its destination route segment and counts off markings present on the path of movement, is compared with a given number, and, if it agrees, produces a switching signal, with whose aid further desired functions of the vehicle can be released. In particular, the drive motor of the vehicle may be responsive to this switching signal so that it stops the vehicle on reaching this point.

Thereby, control of the vehicle is possible even after is has reached desired route segment, which is particularly important in so far as the coding for divisions and branches provides only destination networks and route segments whereas the system in fact allows an infinitely variable path of movement.

According to an advantageous embodiment of the invention, the comparator on the or each vehicle has two parts, of which a first part is arranged to compare said additional series of network signal elements with the destination coding and, on detecting conformity with the network part of the destination coding, causes operation of the second part in which the series of route segment signal elements is compared, and said control means is responsive to detection of conformity with both the network and route segment parts of the coding, indicating that the desired destination route segment is approaching, to cause operation of other functions of the vehicle. The or each vehicle may be provided with a counter, as mentioned before, the counter having an input connected to receive pulses indicative of the extent of travel of the vehicle and an output connected to control the vehicle drive means, and said control means is operative to enable the counter to measure the extent of travel of the vehicle along the destination route segment. In this way a comparatively simple control apparatus is provided together with an advantageous division for the network and route segment choices, whereby by means of the counter the choice of a certain point in the destination route segment as a final destination is possible. The counter and the transmitter provided for it on the path of movement can correspond in structure to the previously mentioned devices. They can moreover be used as a secondary control, since they emerge from a fixed reference point which is first chosen by the destination marking. They may switch the vehicle motor or effect an engagement via the control means which releases any other desired functions of the vehicle.

The expression "route segment" may indicate a zone of a particular network, which is limited generally by two divisions. According to requirements, such segments can be comparatively long so that it may be desirable to provide a sub-division. It is advantageous for this purpose that, in addition to the transmitters associated with the divisions or branches, an additional signal device is provided on a route between two junctions, such transmitter being arranged to send a signal consisting of a series of network and zone signal elements with a destination marking accompanying one of the zone signal elements in order to mark a certain point on the route. With such an additional signal device, no division or branch function is necessary.

A particularly advantageous arrangement is provided if coded signal elements are time-spaced and assigned respective successive time slots and said markings are each provided by an additional signal within a free space in the time slot of the associated signal element.

Preferably each transmitter sends out a series of coded signal elements signal in a continuous succession with beginning or end markings between each transmission, the comparator having synchronising means arranged to detect such markings.

BRIEF DESCRIPTION OF THE DRAWINGS

The invention may be more readily understood from the following description and the accompanying drawings which are given purely by way of example. In the drawings.

DETAILED DESCRIPTION OF THE PREFERRED EMBODIMENTS

Figure 1:
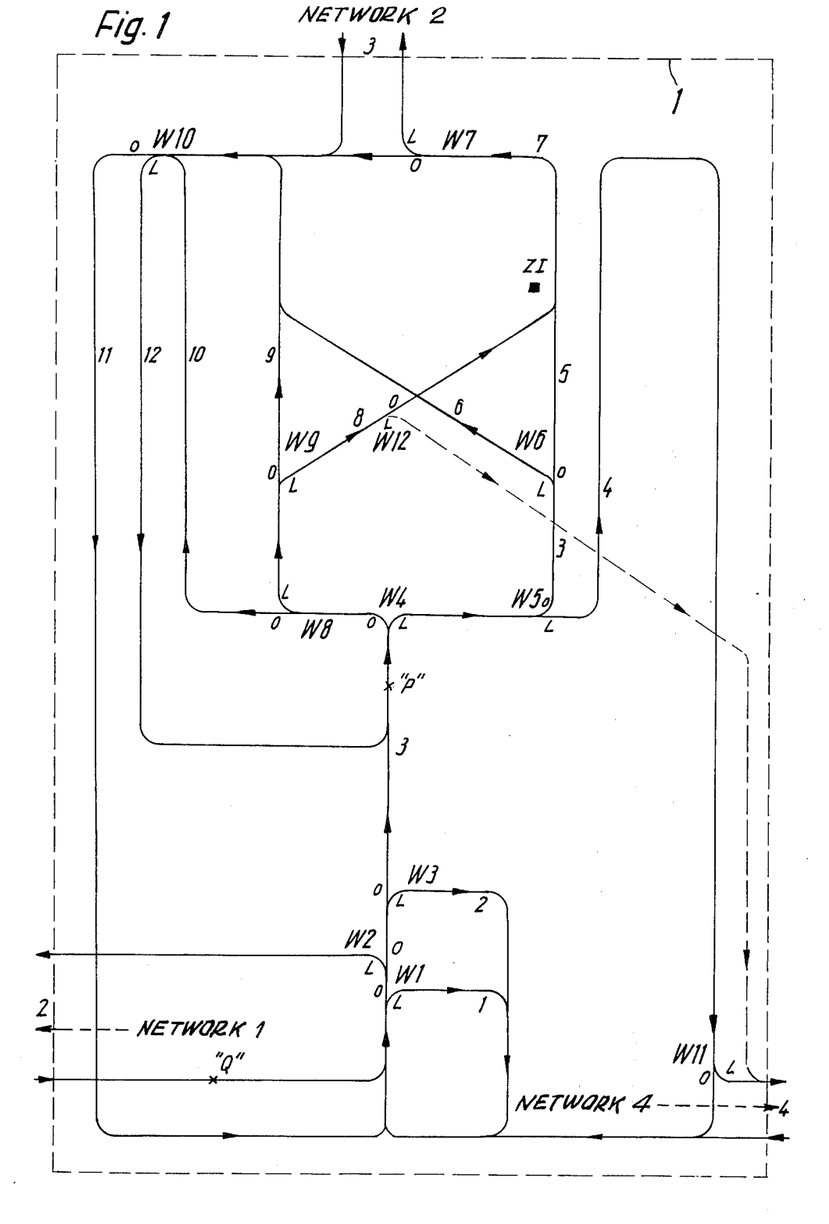
FIG. 1 is a schematic view of one network of a transport system showing divisions within the network and route spurs leading to other networks of the system.

In FIG. 1 a dotted border 1 indicates the boundaries of a network 3 forming part of a transport system. The network 3 is provided with spurs 2, 3 and 4 connecting it, respectively, to further networks 1, 2 and 4. The spurs each consist of two routes which are followed, respectively, only in the directions given by the arrows which have been drawn in. Also, inside the network 3 as well, the indicated routes can only be followed in one direction as shown by the arrows drawn on the lines. In this way a transport system is obtained in which at every point there is a one-way rule for the direction of travel. The network 1 has twelve "divisions" W1 – W12. The expression "division" in the following is also used for a "branch" in the sense explained at the beginning of this specification. The two routes leading from each division are designated "O" and "L", whereby there is always assigned to a direction "O" a certain signal which is the same for all divisions, and to a direction "L" another signal which is also the same for all divisions at a certain point in a series of signals. Furthermore, zones are indicated numerically on certain route segments, whereby it can be seen that zones 1 to 12 are present. These zones are called destination route segments, into which a vehicle can be brought to a halt if such a zone is selected.

The prior apparatus already shows that because of pressure, certain courses to certain destination zones, chosen in practice according to the length of the routes, can be chosen and pre-programmed.

In FIG. 1, because the zones 5 and 7 come into direct contact with one another on a journey from division W6 in the "O" direction, in the region of the junction of zones 5 and 7 an additional signal device ZI is arranged. This device has a particular coding, as has each division W1 – W12, in order to be able to choose as a destination a particular point in zone 7 spaced from the additional signal device ZI, for example by means of a pulse counting device.

Figure 2:
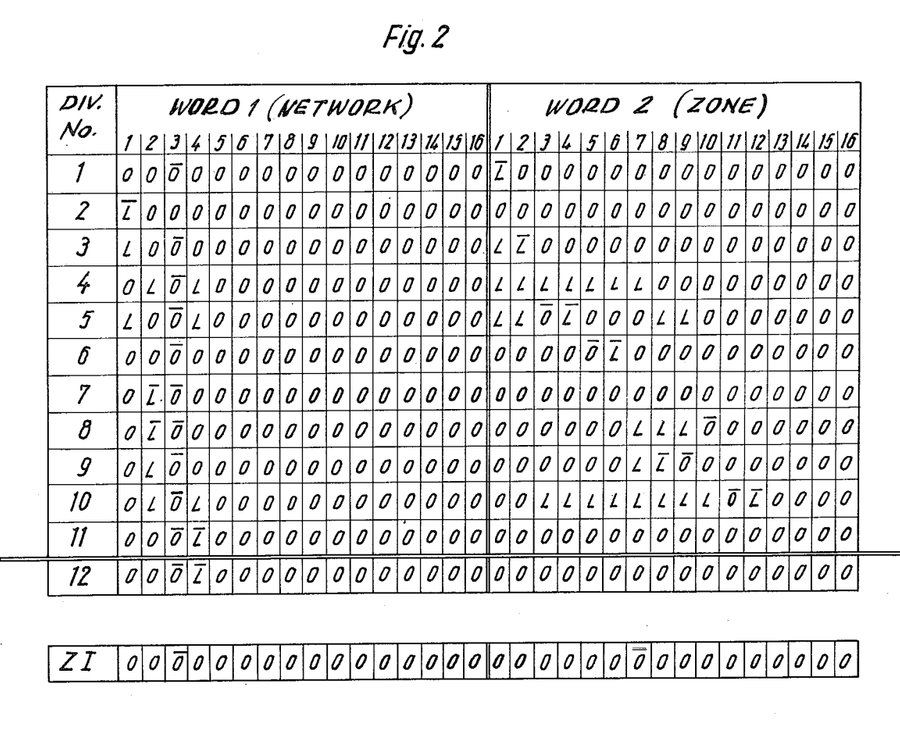
FIG. 2 illustrates schematically a coding scheme for controlling the passage of vehicles through the transport system of which part is shown in FIG. 1.

FIG. 2 shows the signal coding for the twelve divisions W1 – W12 and also for the additional signal device ZI. Each signal is sub-divided into two words, word 1 and word 2, of which word 1 is a series of network signal elements and word 2 is a series of zone signal elements. On the left, in a vertical column, the divisions W1 to W12 are indicated as 1 – 12. Words 1 and 2 are each sub-divided into successive signal elements 1 – 16. Division 12 shows an additional system formation.

For technical reasons each word is preferably subdivided into 16 signal elements. However, any other number can be chosen in accordance with the construction of the system. For example, when there are only four networks, the word 1 could consist of only four signal elements, and on using only twelve zones in each network, the word 2 could consist of twelve elements, one for each zone.

Figure 4:
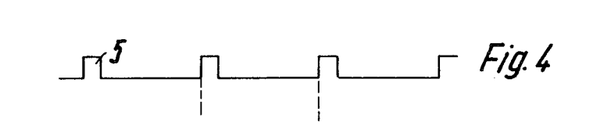
FIG. 4 is a waveform diagram of a series of "O" signal pulses used in transmission of the words shown in FIG. 2.
Figure 5:
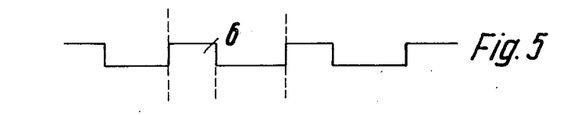
FIG. 5 is a waveform diagram of a series of "L" signal pulses used in transmission of the words shown in FIG.

The signal elements may comprise pulses. As shown in FIG. 4, the signal pulses "O" may be, for example, of a short duration, and the signal pulses "L" may be of a longer duration, as illustrated in FIG. 5. Each signal pulse commences at the beginning of a time slot assigned to a signal element, and the short signal pulses "O" 5 (FIG. 4) constitute, for example, 1/10 of the duration of the slot, whilst the "L" signal pulses 6 (FIG. 5) constitute 4/10 of the duration of slot.

Figures 6, 7:
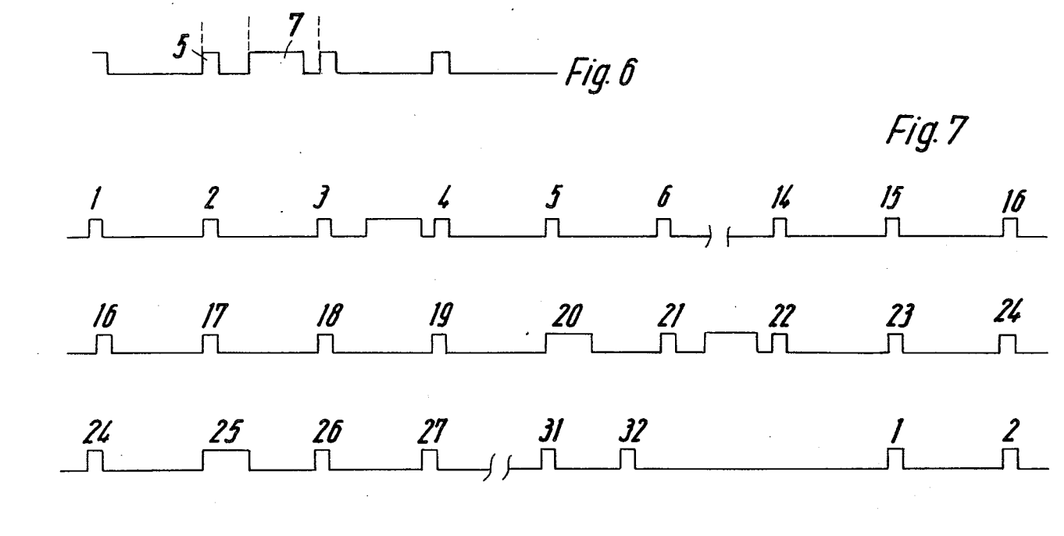
FIG. 6 is a waveform diagram corresponding to FIG. 4, but having a destination marking in a particular signal element time slot.
FIG. 7 is a waveform diagram of a signal consisting of 32 successive pulses making up a pair of network (word 1) and zone (word 2) words as shown in FIG. 2 and indicating a desired destination network and zone in the transport system of which part is shown in FIG. 1.

In FIG. 2, various signal pulses are designated by an upper bar symbol of the type used to designate a negative quantity in Boolean algebra, but not having the same meaning here. The bar designates that the associated signal element time slot includes a destination marking. Such a marking is shown in FIG. 6 by a signal 7 interspersed in a series of "O" signal pulses 5. This signal pulse 7 begins after 4/10 of the duration of a signal element time slot and has a length of 5/10 the duration thereof. For example, a destination marking together with an "L" signal pulse 6 according to FIG. 5 would together provide a signal pulse of 9/10 duration. By means of such arrangement, before the beginning of a signal pulse in a time slot, at least 1/10 of the slot remains free of signal.

FIG. 7 shows a series of pulses for a pair of words 1 and 2, the pulses being numbered 1 to 32. In word 1, in the first three time slots, "O" signal pulses are provided together with a network destination marking in the third slot, while in the fourth to the sixteenth slots "O" pulses are provided. The word 2 pulses are 17 to 32. Pulses 17 to 19, 21 to 24 and 26 to 32 are "O" pulses and a destination marking is included in the time slot of pulse 21. Pulses 20 and 25 are "L" pulses. The large spacing between pulse 32 and the first pulse of a consecutive signal indicates the beginning and end of a signal for synchronisation purposes.

This signal shown in FIG. 7 illustrates by way of example a destination signal indicating that network 3 should be controlled, this being with zone 5 as a destination. If the vehicle is, for example, moving at the point "Q" (FIG. 1), this results in that on the vehicle reaching division 1, in word 1, the same destination network marking is received, so that there is a change-over to word 2.

Continuing with the example according to FIG. 7, for an understanding of FIG. 2 it is emphasised that the word 1 is assigned to the network destination choice. Each division, on at least one of whose branches a destination zone makes contact with the network 3, has a destination marking in work 1 in the third signal element time slot assigned to the network 3. For example, zone 1 makes contact with division 1. Following this, and because this zone only is a destination zone from division 1, word 2 also has a goal marking in the first signal element time slot, which is programmed with a signal pulse "L" corresponding to the alteration in direction.

Between division 2 and division 3 there is no destination zone. For this reason, for division 2 the zone signal in word 2 is not provided with a destination marking. If the spur leading from the branch formed by division 2 were taken, network 1 would be reached, for which reason, according to FIG. 2 both the first and third steps in word 1 contain destination markings, since after moving along the spur, network 1 is reached.

Control of the spurs 2, 3, 4 connecting illustrated network 3 to the networks 1, 2 and 4 and of the non-branching internal divisions of network 3 is provided in like manner as in the above example. The drawings which show sixteen signal elements for the signal formed from word 1 and word 2, makes it clear that for each network and each destination zone only one signal element is required at a time. In the present example, the signal elements 5–16 in word 1 and 13–16 in word 2 remain unused.

Entry of a desired destination marking into a store arranged on a vehicle is determined according to FIG. 2. From this figure it is clear that two series of markings are to be entered, whereby however a continuous marking with signal elements 1 to 32 is possible throughout. In this case, a variable device is provided which sub-divides the signal elements 1 to 32 into two words of any size corresponding to the formation of the system. To enter the destination marking a selector is used. The selector may be in the form of a telephone dial or a keying device, which is provided with sixteen positions or keys corresponding to the present example.

If, for example, a destination zone in network 3 is desired, then according to the coding scheme a sign "$\overline{O}$" or, according to the choice of coding, a sign "L" is written in with the destination marking (7 in FIG. 6) in the time slot of the third signal element in word 1. The same process is used to encode word 2 to mark the destination zone. If several stopping points are provided within a zone, then the stopping point in a particular zone chosen as a destination is marked at the appropriate place in a third word (3) which is not described herein, but may be of the same form as words 1 and 2.

In the example of FIG. 7, the following markings are chosen as destination coding: network 3, zone 5. Basically, any point on the path of movement can be chosen as a starting point. If, for example, a vehicle is located at point $p$ on network 3 and is to be moved to the desired destination, this vehicle first reaches the transmitter at division 4. Comparison of the vehicle destination coding with the coding transmitted by division 4 is carried out for word 1, and shows by means of the destination marking 7 (FIG. 6) in the time slot of the third signal element that network 3, i.e. the destination network, has been reached. This having been established, the comparison process for word 2 is automatically started, since now the destination zone 5 must be found within the network 2. This second comparison shows from examination of the fifth signal element time slot of word 2 firstly that zone 5 has not yet been reached, since there is no destination marking, and secondly that at division 4 the "L" direction must be taken in order to reach zone 5. The next decision to be made in this example is at division 5. Examination of word 1 again shows that the vehicle is already in network 3, and examination of work 2 that the "O" direction must be used taken from division 5 in order to reach goal zone 5. At division 6, the same code examinations are used. Two sets of information are contained in the fifth signal element time slot in word 2. Firstly, in order to reach zone 5, the "O" direction from division 6 must be taken, and secondly, the long pulse forming the destination marking in position 5 provides the information "zone 5 reached", whereby at the same time, as already described, further functions of the vehicle can be brought about.

It is clear that the signal pulses for the destination zone marked according to FIG. 7 in the destination coding as 17 to 32 correspond to word 2 in FIG. 1 in such a way that under the above-mentioned numbers of the destination zone, the signal pulses in the series transformed from above to below. It then follows that the coding of the destination signal then follows with signal pulses corresponding to the vertical rows under the identification number of the chosen network in word 1, and under the identification number for the destination zone on word 2. A destination zone choice is thereby possible by simple means. In a preferred arrangement, a counter can be installed, which records additionally defined markings on the path of movement and can be compared to information fed in previously in word 3 of the destination code, whereby a particular stopping position within the destination zone can be programmed.

If the additional destination zone 7 were to be chosen instead of zone 5, the vehicle would first of all follow the same route — as FIG. 2 shows at word 2. Only on approaching the region of the additional signal device ZI is a signal pulse "destination zone reached" obtained, so that the final stopping position destination coding of word 3 can then be examined. The additional signal device is provided additionally to the transmitters at the divisions or branches, and in order to mark a certain point on the route has a coding consisting of a network and zone signal element series with a corresponding destination marking in the second series of signal elements (see ZI in FIG. 2).

Figure 3:
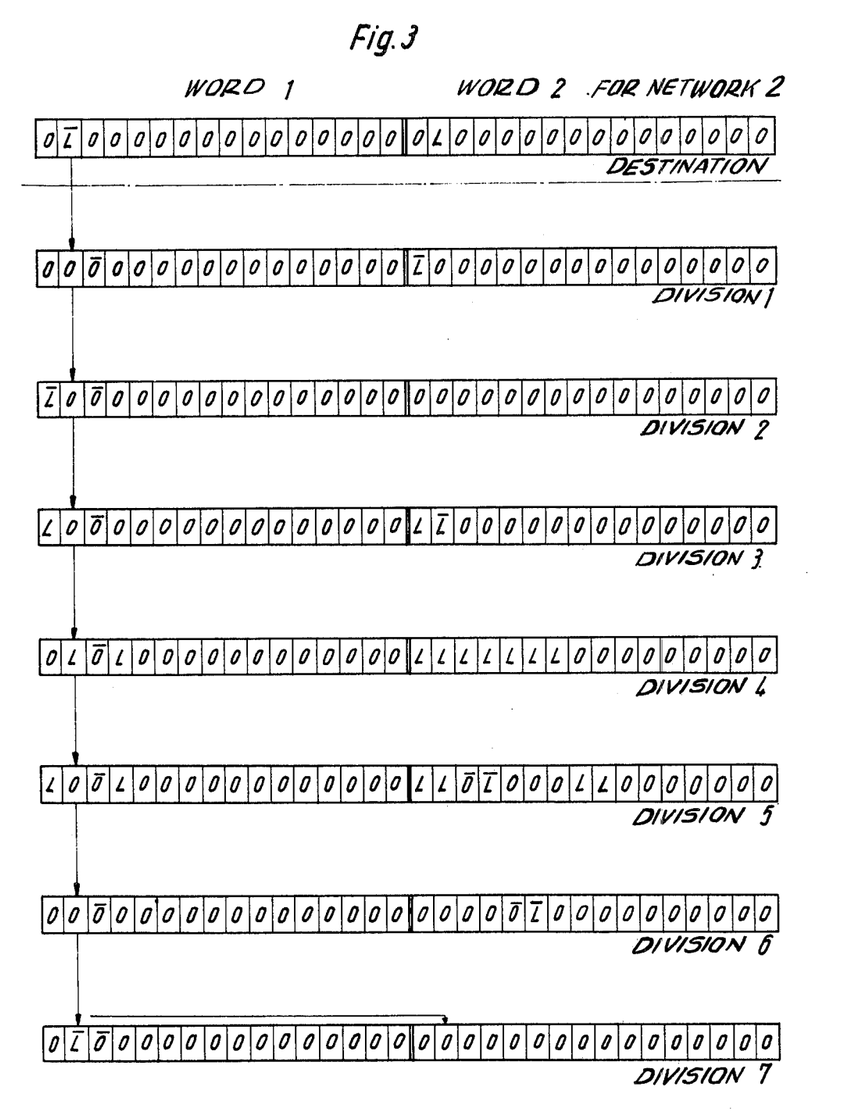
FIG. 3 shows by way of example a sequence of decision steps involved in a path of movement towards a desired destination in the system shown in FIG. 1.

Another example of a route only schematically shown is illustrated in FIG. 3 in the form of a table, whereby the destination stored in the vehicle is marked 8. The vehicle proceeds according to word 1 along the spur 3 to network 2 and there reaches a destination zone 2 not illustrated in FIG. 1. From the above illustrations it will be seeen that if the vehicle proceeds, for example, from point $q$ in network 3, it will travel via divisions 1 to 3 in the "O" direction, via division 4 in the "L" direction and via divisions 5 and 6 in the "O" direction to division 7, whereby the programmed movement direction "L" is at the same time given a destination marking, so that there is a change-over on word 2 of the comparator. Because the second signal element time slot in word 2 then has no destination marking, the movement is continued in network 2.

It is clear that with the arrangement described, every destination zone can be attained by means of simple application of a destination marking of any point on the route. It is furthermore clear that additional route segments can be subsequently added from any point to any point of the route. To accomplish that it is only necessary to alter the coding, for example by altering a diode matrix at the divisions or branches which are differently or no longer used through the new route direction, in order to give access to a certain goal zone.

In such manner the coding of the transmitters can be simply altered in any way so that new route directions are given to a destination point, and route segments are added or removed, whereby the comparator in the vehicle remains uncharged. Alterations in the transmitters are comparatively easy.

In the route network according to FIG. 1, the dotted line leading from division 12 designates a subsequently added connection to network 4. In this case, the individual alteration in applying the new code transmitter consists of division 12.

After it has reached the destination, a clearing device on the vehicle may be arranged to clear the code comparison apparatus so that a new destination code can be fed therein.

However, the clearing device can instead be disconnected and a repetition system connected, which automatically controls return of the vehicle to the previously entered exit point, whereby the repetition device can bring about an adjustable repetition of such movements. Furthermore, remote control of the vehicle coding may be provided by a transmitter at a central point which has the same coding action as the abovementioned manual coding means in the form of selector dials or keys. With such a precautionary measure, priorities can be included in the course of the movement program or repetition of certain movement programs can be carried out. It can be understood that in such a system having several vehicles, a key coding is assigned to each vehicle so that, if required, a transmitted (e.g. a radio) coding reaches only the desired vehicle.

In connection with such vehicle key codings, a priority signal can be sent, which releases or replaces previously given goal destination instructions in order that the vehicle will firstly go to the subsequently instructed priority destination. Advantageously, the new destination coding transmitted from the centre causes the present coding to be entered into a store provided on the vehicle, whereby replacement then takes place as long as priority codings are present. In this way, reintroduction of the originally present coding takes place in dependence on a particular signal or automatically, wherein a particular signal pulse is included in the last coding provided with a priority signal to release the store for the purpose of entering the original destination coding into the comparator.

The control apparatus may be arranged to apply a new destination coding to a vehicle from a distance so is that it can receive the new coding at any point in the whole transport system both during movement and while stationary. In a particular apparatus, the conversion of the new destination coding should only take place at the stopping point on the transport system. In another apparatus a few stopping points (information points) are located at important parts of the system and serve exclusively to transfer a new destination code from the central point to a vehicle. To this end, the control apparatus may be arranged so that after reaching a programmed route stopping point, the previous destination code stored in the vehicle is dispensed with and the coded address of an information point which is stored in the vehicle is applied as a new destination code, so that the vehicle will go to the information point and there receive the next destination instruction from the centre. In a particular apparatus, in each network only one information point is provided, which is destination coded in the same manner as a normal destination zone. The coding is the same for every network and is fed into the vehicle. After reaching the programmed destination, the code of the information point is regarded as a new destination, and the vehicle moves to the information point within the network in which it is then present. There, the receipt of a new destination code is possible.

The movement operation in a complicated route network with several vehicles shows that in practice, there are stopping points or route segments which are frequented to a greater degree than others, so that obstructions and queues arise, which include vehicles which do not have the blocked segments as destinations. For these vehicles it is desirable that means be provided for avoiding the obstructions. In a particular embodiment of the present invention, this problem is solved in that all the transmitters of the transport system are connected to a central point so that the coding of each transmitter can be altered, and a checker in the centre detects the obstruction, while the route segments employed by the vehicles are displayed on an indicator board, e.g. by lighting up lamps. On changing the code signals on suitable individual divisions from the centre, the routes of the vehicles which are approaching the obstruction and do not have the obstructions as their destination are altered, whereby the obstruction is avoided by diversions.

In a further embodiment of the present invention an increase in the degree of automisation of the whole moving operation is achieved, in that each vehicle receives a starting code which is characteristic only of that vehicle and a destination code, which are stored in the vehicle in suitable stores. The starting code serves only to set the vehicle in motion from the centre. Numerous transmitters on divisions, branches and additional signal devices are connected to the centre and their coding can be altered in any way from there.

According to this embodiment, each vehicle present in the transport system is advantageously provided with its own constant starting code and destination code, and after the vehicle has started with the aid of the starting code, the constant destination code characteristic of the vehicle is replaced from the centre with the code of the desired destination, and all divisions and branches are so coded from the centre that the vehicle reaches its destination whilst avoiding a conversion and special storage of a genuine destination coding in the vehicle, i.e. dependent on the original formation of the network or path of movement.

After receiving the starting code, the vehicle uses its own constant destination code as a fictitious destination, while in the centre, the fictitious destination of the vehicle is replaced by the desired destination. Course control is achieved in that the centre alters the transmission coding of the transmitter, which occurs on the vehicle on the course from the starting point to the destination, so that by comparing the code information received in the vehicle with the fictitious destination information, the shortest way to the real destination is taken.

Even with only a few vehicles using the transport system at the same time, operation of the centre by hand is generally no longer possible, so that in this case a process calculator or a similar calculating apparatus is provided in the centre, which because of its high speed of operation is able to carry out the necessary number of coding operations.

Figure 8:
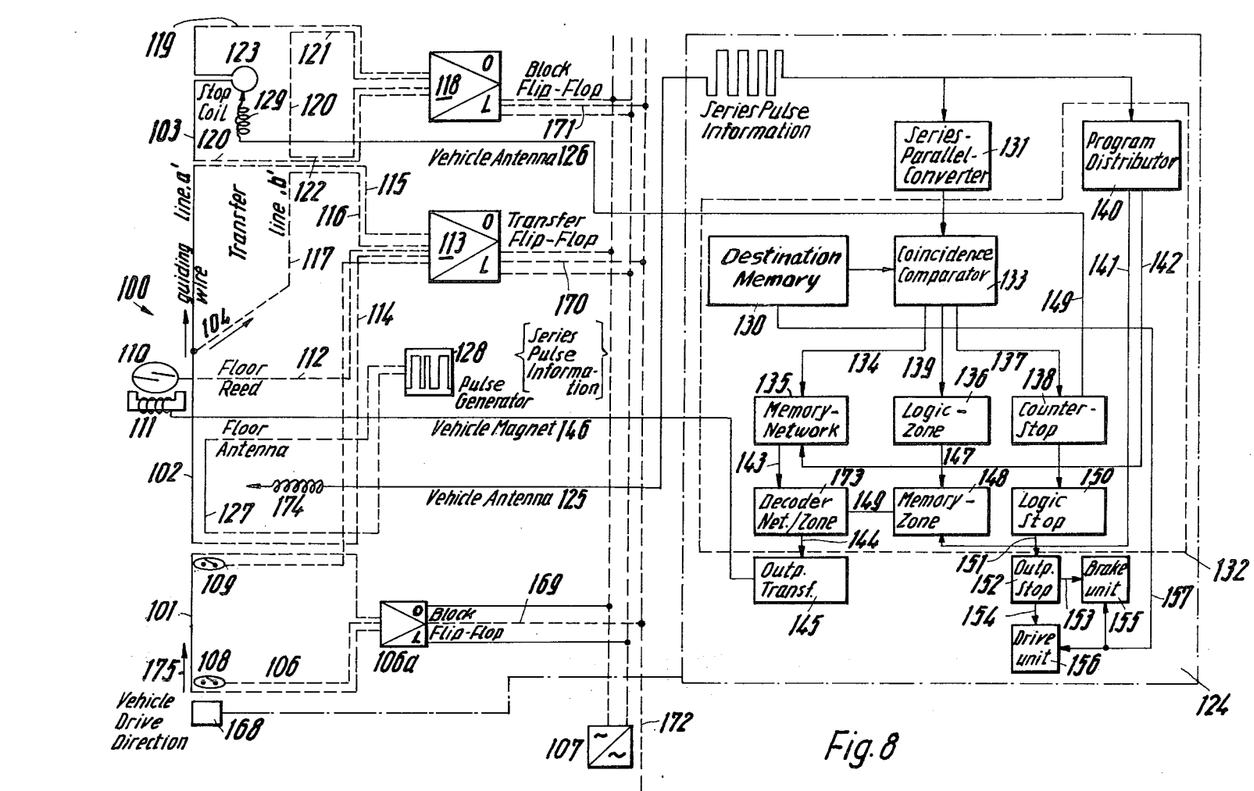
FIG. 8 is a block diagram showing vehicle-mounted and fixed control devices which cooperate to control movement of a vehicle through the transport system to a desired destination.

FIG. 8 is a block diagram showing vehicle-mounted and fixed parts of control apparatus in accordance with the invention for guiding a vehicle through a transport system to a required destination. In this figure, reference numeral 100 indicates a route which may be subdivided for clarity into individual segments 101, 102, 103. Segment 102 contains a division 104. This division signifies in the present case a possible alteration in the direction of the route. Interaction between the vehicle and route in the example according to FIG. 8 is accomplished by a non-contact conductor arrangement through guiding wires laid in the floor, which are fed with electrical energy, for example at a frequency of 10kHz, and whose course makes contact with vehicle-mounted receivers 105 (FIGS. 9 and 10) connectd by rotating stands or steering devices in the vehicle in order to guide the vehicle along the path 100 which is indicated by the wires laid in the floor.

As is shown, route segment 101 is energised via a conductor 106 from a generator 107, which operates in a block flip-flop 106a via a transformer and is energised by switches 108 and 109 arranged at the beginning and end of the segment, respectively.

The supply lines, one of which is marked 106, are connected via the block flip-flop 106a and corresponding flip-flops 113, 118, and lines 169, 170, 171, to a closed control line 172.

Switches 108 and 109 associated with the route segment 101 can be magnetically actuated switches laid in the floor, which are actuated by a counter switching element (magnet) 168 in the vehicle passing above. In this way the advantage arises that energy for guiding the vehicle is only used if a vehicle moves over that route section.

The counter switching element 168 can also be, for example, a permanent magnet.

Switches corresponding to the switches 108, 109 are also arranged on the other segments 102, 103, but are not shown in FIG. 8.

Before the division 104 in segment 102 there is arranged a switch 110, for example a magnetically actuable, reed switch embedded in the floor of the route, for whose operation an actuating magnet 111 is arranged on the vehicle. From this switch a conductor 112 leads to a transfer flip-flop switching unit 113, which corresponds to the unit 106a, but not only has leads 114, 115 connecting it to the segment 102 but also a lead 116 connecting it to the divided route segment 117. According to the actuation of the switch 110, energy is directed either along the segment 102 (line a) or along the segment 117 (line b). It should be understood from the one lead 114 common to both segments that, in the direction of movement shown by an arrow 175, the first part of the segment 102 extends up to the division 104.

Correspondingly, on the block flip-flop switching unit 118, not only are leads 119, 120 provided for the segment 103, but further leads 121, 122 are directed to a route segment 120, which is an extension of segment 117. Since the segments 103 and 120 are arranged at a distance from one another, both can be energised at the same time, although, dependent on actuation through switches similar to 108 or 109, preferably only one of the segments is energised.

In the route segment 103 a special stop coil is provided, as for example is illustrated by 123, by which the amount of energy used is altered, for example raised. This concerns so-called stopping points, as is shown in FIG. 1 by ZI. Such stopping points serve the purpose of keeping the vehicle, if required, at a certain point along a route. It thereby concerns the so-called additional signal devices.

Figure 9:
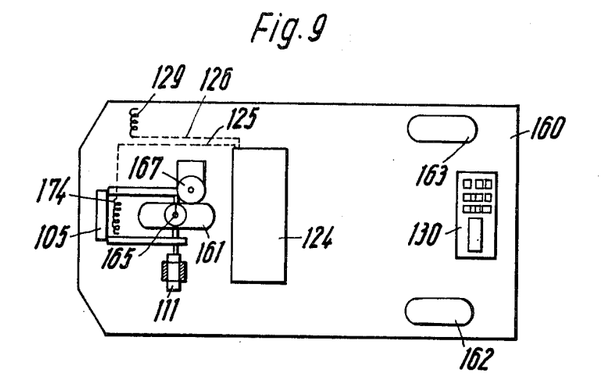
FIG. 9 is a schematic plan view of the vehicle which mounts part of the circuit of FIG. 8.
Figure 10:
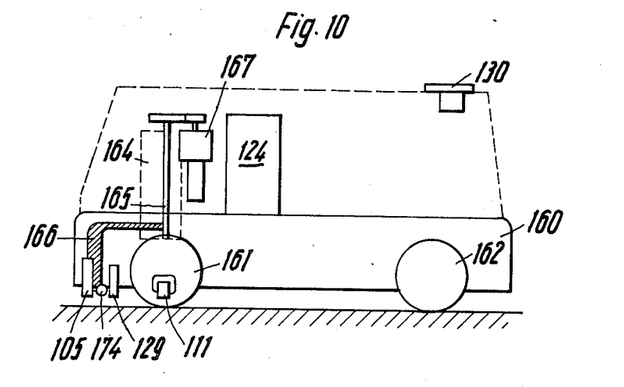
FIG. 10 is a schematic side view of the vehicle of FIG. 9.

The parts arranged on the vehicle shown in FIGS. 9 and 10 are illustrated in FIG. 8 within the border 124.

As can also be seen from FIG. 9, the vehicle is provided with two antennae 125, 126, in addition to the receiver 105, which effects the steering of a rail-less vehicle.

The antennae 125, 126 are set up near to the surface of the route, in order to receive certain signals. Furthermore, corresponding to the actuating magnet 111, a release arrangement for one switch laid on the route is arranged before a branch, which is however provided in the vehicle on a transmitter.

Before such a branch or division 104 there is besides this laid on the route a transmitter loop 127, which is connected to a pulse generator 128, which sends out the characteristic coding of the relevant division, which is sensed by the vehicle antenna 125. The pulse generator 128 operates, for example, at 70kHz, so that its signals can be received independently of the route signals. This pulse generator can also be turned off by a switch in the route segment 102 corresponding to the switch 108, if the vehicle reaches the route segment 102 with the division 104.

The antenna 125, which by means of discriminators 174 is tuned to receive signals sent at 70kHz, passes this pulse information to the equipment on the vehicle. The antenna 126 is on the other hand tuned by means of discriminators 129 to a signal pulse frequency in the order of 10kHz. Both antennae can be arranged on the lower side of the vehicle next to or behind one another.

On the vehicle is provided a destination memory or store 130, in which the destination coding can be entered in the manner already described or by means of a magnetic card or punched card or also by a press button. Furthermore, there is a receiver 131 on the vehicle, to which the antenna 125 is connected for introducing the received series of pulses. This receiver is formed as a series/parallel converter, which converts the series pulses received from the division transmitter into pulses for feeding into a comparator signified by the border 132. In the comparator 132, a coincidence comparator 133 is fed both with the signal from the converter 131 and with the destination coding signal in the memory 130. The coincidence comparator 133 provides three output signals, of which one is directed via a lead 134 into a network memory switch 135, another via a lead 139 into a zone logic switch 136 for choosing the zone or choosing a segment of a route, and the third via a lead 137 into a stop counter 138 for controlling the operation of the vehicle.

In this connection it should be remembered that the destination coding signal is distributed into word groups, of which the first word designates by a series of signal elements the destination network of the transport system. The second word designates in a network the movement via certain divisions to zones of the network, and the third word of the coding designates the stopping point on a certain zone in a network.

In order to employ the destination coding correctly, the signal received by the antenna 125 is fed also into a program distributor 140. This program distributor divides into word groups the signals led via leads 134, 137, 139, by means of leads 141, 142, whereby, after receiving and working on the network destination word of the coding, the network memory switch 135 is disabled and the zone logic switch 136 is brought into action. After the word for zone movement has been released, the switch 136 is disabled via lead 141, so that the signal on lead 137 is made effective.

The network memory switch 135 is fed with the destination network code. If agreement is obtained therein with the signal on lead 134, a further signal is fed via a lead 143 to a network/zone decoder 173, while the signal which has been stored can then be sent. On the exit 144 of the comparator 132 this signal which can be sent is then fed into an output transfer unit 145, in order to actuate the switch 110 if required. This can hereby effect actuation of the branches, as shown in FIG. 1 by W2, W7 and W11. The corresponding coding ensures then that the correct signal is led through.

If a certain network has already been arrived at and a certain point has already driven along, the signal chosen via the zone logic switch 136 is fed via lead 147 into a zone memory or store 148, in which the route segments or zones of a certain network are fed. This then concerns the zones marked 1 to 12 in FIG. 1. If agreement is reached between a signal fed into the store 148 and the given signal, a corresponding signal is passed via lead 149 to decoder 173, which then feeds the unit 145. In this case, the switch 110 is actuated in the way already described, so that the transfer flip-flop switching unit 113 is changed between its loops in such a way that for example the route segment 117 is selected.

If the series of signals for the zone is given off and a corresponding effect follows through the program distributor 140 as a result of recording the signal elements, the signal is fed via the lead 137 to the stop counter 138 for stopping the vehicle. This counter is fed at the same time via lead 149 by the antenna 126, in order to count the stopping signals on the route. On agreement of the programmed number with the number of stopping points driven past, the signal is transferred to a stop logic switching unit 150, from which stop output unit 152 is stimulated via output lead 151 of the unit 150, the unit 152 supplying signal via leads 153, 154 to a brake unit 155 and to a motor drive control 156, in order to stop the vehicle.

Both units 155, 156 are connected via a lead 157 to the memory 130, this being with the purpose of releasing the units 155 and 156 by newly coding the arrangement to reach a new goal.

FIGS. 9 and 10 show schematically a vehicle construction having a framework 160, a steerable front drive wheel 161 and rear wheels 162, 163. Other parts of the vehicle are designated with the reference numerals already mentioned. A steering and drive unit 164 for the front wheel 161 can be rotated about a vertical axis in a known way, whereby a forwardly-directed support 166 is connected with the receiver 105. Steering is effected in a known way via a steering motor 167.

The individual groups can be constructed from commercially used structures and elements, as obtainable, for example, from Texas Instruments, Sescosen or RCA.

I claim:

1. For a closed transport system comprising a plurality of routes, a plurality of route junctions which each allow a choice of two directions, and at least one vehicle arranged to travel along said routes, a control apparatus comprising: a transmitter associated with each said junction, each transmitter being adapted to transmit a particular coded signal indicating the direction to be taken at the associated junction to proceed towards various route segments; drive means on each of the one or more vehicles for moving each of the one or more vehicles; and a respective destination selection device on each of the one or more vehicles connected to control the drive means of such vehicle, each said device comprising: a store in which may be entered a code indicative of a destination route segment for the vehicle; a receiver for receiving the coded signal transmitted from the transmitter associated with an approaching junction; a comparator connected to the associated store and receiver for comparing said stored destination signal and said received signal; and control means responsive to the output of the associated comparator to select the direction to be taken by the associated vehicle at the junction each transmitter including sending means to send said coded signal in the form of a fixed series of signal elements each associated with a particular segment and destination marking together with any said signal element associated with a route segment which will be reached on leaving the associated junction, and on the vehicle said receiver and comparator including operating means to function with the same number of signal elements.

2. Control apparatus according to claim 1, wherein each of the one or more vehicles is provided with a steering device and said control means is operative on the steering device of the associated vehicle to cause such vehicle to take the selected direction.

3. Control apparatus according to claim 1 wherein each control means is operative on means associated with an approaching junction such that the junction either remains in one position or switches to another position, according to the direction to be taken.

4. Control apparatus according to claim 1 for use with a transport system which is sub-divided into a plurality of interconnected networks, wherein each transmitter is arranged to send an additional series of signal elements corresponding at least to the number of said networks, and the code entered in the or each store is also indicative of a destination network.

5. An apparatus as in claim 4, wherein said comparator means responds to agreement between the destination signal of the receiver and the store by causing said control means to steer the vehicle, said transmitter and said store assigning the destination signal at each signal step whenever a destination can be reached immediately beyond the junction of the transmitter.

6. An apparatus as in claim 5, wherein each transmitter is adapted to repetitively send out said series of coded signal elements as a continuous succession of signal elements with beginning or end markings between each said series, and said comparator has a synchronizing means arranged to detect such markings.

7. An apparatus as in claim 6, wherein each transmitter is adapted to send an interval between each series of pulses to indicate the beginning and end of a series.

8. A system as in claim 4, wherein the destination marking is provided by an additional signal within a signal step in a region left out by the signal pulses.

9. Control apparatus according to claim 4 wherein each transmitter is adapted to transmit a destination marking together with any of said additional series of signal elements associated with a network which will be reached on leaving the associated junction.

10. Control apparatus according to claim 4, wherein the comparator associated with each of the one or more vehicles includes first means operative to cause comparison of said additional series of received network signal elements with the network part of the destination coding to detect conformity therebetween, and second means connected to said first means and responsive to detection of conformity by said first means to cause comparison of the received series of route segment signal elements with the route segment part of the destination coding to detect conformity therebetween, said control means being responsive to detection of conformity with both the network and route segment parts of the coding by said first and second means respectively, indicating that the desired destination route segment is approaching, to cause operation of other functions of the vehicle.

11. Control apparatus according to claim 10, wherein each of the one or more vehicles is provided with a counter having an input connected to receive pulses indicative of the extent of travel of the vehicle and an output connected to control the vehicle drive means, and said control means is operative to enable said counter once the destination route segment has been arrived at to measure the extent of travel of the vehicle along the destination route segment.

12. Control apparatus according to claim 11, wherein said counter on each of the one or more vehicles is adapted to generate a signal once a desired count has been reached, and means is provided responsive to said signal to cause stopping of the vehicle.

13. Control apparatus according to claim 10, wherein a signal device having a transmitter is provided on a route between two junctions, such transmitter being adapted to send a signal consisting of a series of network and zone signal elements with a destination marking accompanying one of the zone signal elements in order to mark a certain point on the route.

14. Control apparatus according to claim 1, wherein each transmitter is adapted to send said coded signal such that said signal elements are time-spaced and assigned respective successive time slots, said markings each being provided by an additional signal within a free space in the time slot of the associated signal element.

15. Control apparatus according to claim 14 wherein each transmitter is adapted to send said coded signal such that said signal elements are of two different lengths, each length indicating a respective direction to be taken from the associated junction to proceed towards the associated route segment.

16. Control apparatus according to claim 1 wherein each transmitter is adapted to repetitively send out said series of coded signal elements as a continuous succession of signal elements with beginning or end markings between each said series, and said comparator has synchronising means arranged to detect such markings.

17. Control apparatus according to claim 16 wherein each transmitter is adapted to send an interval between each series of pulses to indicate the beginning and end of a series.

18. Control apparatus according to claim 1 including means for varying the coding of each transmitter in order to give new route directions to a destination and to add or remove route segments.

19. Control apparatus as claimed in claim 1 wherein means is provided at at least one stopping point on the system for altering the destination coding of a vehicle thereat.

20. An apparatus as in claim 1, wherein said comparator means responds to agreement between the destination signal of the receiver and the store by causing said control means to steer the vehicle, said transmitter and said store assigning the destination signal at each signal step whenever a destination can be reached immediately beyond the junction of the transmitter.

21. An apparatus as in claim 1, wherein each store includes a destination code and each vehicle has its own starting code, said comparator comparing the starting code with the code of the desired destination and said junctions being coded so that the vehicle reaches its destination.

22. An apparatus as in claim 1, wherein the sending means in each transmitter forms each signal element so as to produce a mark and a space with the length of the mark indicating one or another signal, and forms the destination marking in any one signal element as an additional mark within the space.

23. For a closed transport system comprising a plurality of routes, a plurality of route junctions which each allow a choice of two directions, and at least one vehicle arranged to travel along said routes, a control apparatus comprising: a transmitter associated with each said junction, each transmitter being adapted to transmit a particular coded signal indicating the direction to be taken at the associated junction to proceed towards various route segments; drive means on each of the one or more vehicles for moving each of the one or more vehicles; and a respective destination selection device on each of the one or more vehicles connected to control the drive means of such vehicle, each said device comprising: a store in which may be entered a code indicative of a destination route segment for the vehicle; a receiver for receiving the coded signal transmitted from the transmitter associated with an approaching junction; a comparator connected to the associated store and receiver for comparing said stored destination signal and said received signal; and control means responsive to the output of the associated comparator to select the direction to be taken by the associated vehicle at the junction each transmitter including sending means to send said coded signal in the form of a fixed series of signal elements each associated with a particular segment and destination marking together with any said signal element associated with a route segment which will be reached on leaving the associated junction, and on the vehicle said receiver and comparator including operating means to function with the same number of signal elements each of said control means being operative on means associated with an approaching junction such that the junction either remains in one position or switches to another position, according to the direction to be taken; each control means including a timing circuit, which, after said control means has caused switching of a junction, is operative to cause said means associated with the junction to return the junction to its original position.

24. For a closed transport system comprising a plurality of routes, a plurality of route junctions which each allow a choice of two directions, and at least one vehicle arranged to travel along said routes, a control apapratus comprising; a transmitter associated with each said junction, each transmitter being adapted to transmit a particular coded signal indicating the direction to be taken at the associated junction to proceed towards various route segments; drive means on each of the one or more vehicles for moving each of the one or more vehicles; and a respective destination selection device on each of the one or more vehicles connected to control the drive means of such vehicle, each said device comprising; a store in which may be entered a code indicative of a destination route segment for the vehicle, a receiver for receiving the coded signal transmitted from the transmitter associated with an approaching junction; a comparator connected to the associated store and receiver for comparing said stored destination signal and said received signal; and control means responsive to the output of the associated comparator to select the direction to be taken by the associated vehicle at the junction each transmitter including sending means to send said coded signal in the form of a fixed series of signal elements each associated with a particular segment and destination marking together with any said signal element associated with a route segment which will be reached on leaving the associated junction, and on the vehicle said receiver and comparator including operating means to function with the same number of signal elements, means for varying the coding of each transmitter in order to give new route directions to a destination and to add or remove route segments; a central control unit, said transmitters being connected to said central control unit for alteration of selected transmitter codings therefrom to modify vehicle paths to avoid obstructions or blockages of the transport system.

25.

For a closed transport system comprising a plurality of routes, a plurality of route junctions which each allow a choice of two directions, and at least one vehicle arranged to travel along said routes, a control apparatus comprising: a transmitter associated with each said junction, each transmitter being adapted to transmit a particular coded signal indicating the direction to be taken at the associated junction to proceed towards various route segments; drive means on each of the one or more vehicles for moving each of the one or more vehicles; and a respective destination selection device on each of the one or more vehicles connected to control the drive means of such vehicle, each said device comprising: a store in which may be entered a code indicative of a destination route segment for the vehicle; a receiver for receiving the coded signal transmitted from the transmitter associated with an approaching junction; a comparator connected to the associated store and receiver for comparing said stored destination signal and said received signal; and control means responsive to the output of the associated comparator to select the direction to be taken by the associated vehicle at the junction each transmitter including sending means to send said coded signal in the form of a fixed series of signal elements each associated with a particular segment and destination marking together with any said signal element associated with a route segment which will be reached on leaving the associated junction, and on the vehicle said receiver and comparator including operating means to function with the same number of signal elements; a central control unit, each of the one or more vehicles being in communication with said central control unit so that the destination coding in said store can be altered at any point in the system.

26. Control apparatus according to claim 25 wherein said one or more vehicles in communication with said central control unit include a second store and means for transferring the code in the first-mentioned store into said second store for retaining the replaced code until a priority code entered into the first-mentioned store from said central control unit is executed.

27. For a closed transport system comprising a plurality of routes, a plurality of route junctions which each allow a choice of two directions, and at least one vehicle arranged to travel along said routes, a control apparatus comprising: a transmitter associated with each said junction, each transmitter being adapted to transmit a particular coded signal indicating the direction to be taken at the associated junction to proceed towards various route segments; drive means on each of the one or more vehicles for moving each of the one or more vehicles; and a respective destination selection device on each of the one or more vehicles connected to control the drive means of such vehicle, each said device comprising: a store in which may be entered a code indicative of a destination route segment for the vehicle; a receiver for receiving the coded signal transmitted from the transmitter associated with an approaching junction; a comparator connected to the associated store and receiver for comparing said stored destination signal and said received signal; and control means responsive to the output of the associated comparator to select the direction to be taken by the associated vehicle at the junction each transmitter including sending means to send said coded signal in the form of a fixed series of signal elements each associated with a particular segment and destination marking together with any said signal element associated with a route segment which will be reached on leaving the associated junction, and on the vehicle said receiver and comparator including operating means to function with the same number of signal elements each of the one or more vehicles being in communication with a central control unit and is provided with means for storing a respective, individual code and a fixed destination code and means responsive to receipt of a desired destination code from said control unit to replace said fixed destination code with such received code, whereby after the vehicle has started with the aid of said fixed destination code, said fixed destination code can be replaced from said central control unit with the code of the desired destination.

28. For a closed transport system comprising a plurality of routes, a plurality of route junctions which each allow a choice of two directions, and at least one vehicle arranged to travel along said routes, a control apparatus comprising: a transmitter associated with each said junction, each transmitter being adapted to transmit a particular coded signal indicating the direction to be taken at the associated junction to proceed towards various route segments; drive means on each of the one or more vehicles for moving each of the one or more vehicles; and a respective destination selection device on each of the one or more vehicles connected to control the drive means of such vehicle, each said device comprising; a store in which may be entered a code indicative of a destination route segment for the vehicle; a receiver for receiving the coded signal transmitted from the transmitter associated with an approaching junction, a comparator connected to the associated store and receiver for comparing said stored destination signal and said received signal; and control means responsive to the output of the associated comparator to select the direction to be taken by the associated vehicle at the junction each transmitter including sending means to send said coded signal in the form of a fixed series of signal elements each associated with a particular segment and destination marking together with any said signal element associated with a route segment which will be reached on leaving the associated junction, and on the vehicle said receiver and comparator including operating means to function with the same number of signal elements, each of the one or more vehicles being in communication with a central control unit and is provided with means for storing a respective, individual code and a fixed destination code and means responsive to receipt of a desired destination code from said control unit to replace said fixed destination code with such received code, whereby after the vehicle has started with the aid of said fixed destination code, said fixed destination code can be replaced from said central control unit with the code of the desired destination; and comparator means responding to agreement between the destination signal of the receiver and the store by causing said control means to steer the vehicle, said transmitter and said store assigning the destination signal at each signal step whenever a destination can be reached immediately beyond the junction of the transmitter; the comparator associated with each of the one or more vehicles including first means operative to cause comparison of said additional series of received network signal elements with the network part of the destination coding to detect conformity therebetween, and second means connected to said first means and responsive to detection of conformity of said first means to cause comparison of the received series of route segment signal elements with the route segment part of the destination coding to detect conformity therebetween, said control means being responsive to detection of conformity with both the network and route segment parts of the coding by said first and second means respectively, indicating that the desired destination route segment is approaching, to cause operation of other functions of the vehicle.

* * * * *